United States Patent
Sharshevsky et al.

(10) Patent No.: US 11,494,556 B2
(45) Date of Patent: *Nov. 8, 2022

(54) SYSTEMS AND METHODS FOR DETECTING LOCATIONS OF WEBPAGE ELEMENTS

(71) Applicant: PayPal, Inc., San Jose, CA (US)

(72) Inventors: Olga Sharshevsky, Holon (IL); Yarden Raiskin, Giv'atayim (IL); Ran Yuchtman, Rishon-Lezion (IL)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,853

(22) Filed: Dec. 22, 2021

(65) Prior Publication Data

US 2022/0114336 A1    Apr. 14, 2022

Related U.S. Application Data

(63) Continuation of application No. 16/559,020, filed on Sep. 3, 2019, now Pat. No. 11,210,464.

(51) Int. Cl.
| | |
|---|---|
| *G06F 17/00* | (2019.01) |
| *G06F 40/221* | (2020.01) |
| *G06F 16/958* | (2019.01) |
| *G06F 16/953* | (2019.01) |
| *G06F 40/226* | (2020.01) |
| *G06Q 30/06* | (2012.01) |

(52) U.S. Cl.
CPC .......... *G06F 40/221* (2020.01); *G06F 16/953* (2019.01); *G06F 16/986* (2019.01); *G06F 40/226* (2020.01); *G06Q 30/0641* (2013.01)

(58) Field of Classification Search
CPC .... G06F 40/221; G06F 16/953; G06F 16/986; G06F 40/226
See application file for complete search history.

(56) References Cited

U.S. PATENT DOCUMENTS

| | | | |
|---|---|---|---|
| 8,225,197 B1 | 7/2012 | Szewczyk | |
| 8,893,278 B1 | 11/2014 | Chechik | |
| 10,474,815 B2 * | 11/2019 | Turgeman | G06F 21/316 |

(Continued)

OTHER PUBLICATIONS

Bower T., "Identifying JavaScript Skimmers On High-Value Websites," Jun. 17, 2019, Retrieved from the Internet: URL: https://www.imperial.ac.uk/media/imperial-college/faculty-of-engineering/computing/public/1819-ug-projects/BowerT-Industry-project-identifying-JavaScript-skimmers-on-high-value-websites.pdf, retrieved on (Oct. 29, 2020), 76 pages.

(Continued)

*Primary Examiner* — Mohammed H Zuberi
(74) *Attorney, Agent, or Firm* — Haynes and Boone, LLP

(57) ABSTRACT

Methods and systems are presented for automatically detecting positions of various webpage elements within a webpage when the webpage is rendered, based on analyzing the programming code of the webpage. A position detection system obtains and parses the programming code of the webpage to identify webpage elements within the webpage. A group of related webpage elements is identified based on a shared programming structure. The position detection system generates a DOM tree based on the programming code, and determines relative positions of the webpage elements within the group by traversing the DOM tree using a breadth-first search algorithm.

20 Claims, 6 Drawing Sheets

(56) References Cited

U.S. PATENT DOCUMENTS

| | | | |
|---|---|---|---|
| 10,523,680 B2 | 12/2019 | Turgeman et al. | |
| 10,579,784 B2 | 3/2020 | Turgeman | |
| 10,586,036 B2 | 3/2020 | Turgeman | |
| 10,621,585 B2* | 4/2020 | Turgeman | G06F 21/554 |
| 10,685,355 B2 | 6/2020 | Novick et al. | |
| 10,719,765 B2 | 7/2020 | Novik et al. | |
| 10,728,761 B2 | 7/2020 | Kedem et al. | |
| 10,747,305 B2 | 8/2020 | Turgeman | |
| 10,776,476 B2 | 9/2020 | Turgeman et al. | |
| 10,834,590 B2 | 11/2020 | Turgeman et al. | |
| 10,897,482 B2 | 1/2021 | Rivner et al. | |
| 10,917,431 B2 | 2/2021 | Turgeman | |
| 10,949,514 B2 | 3/2021 | Turgeman et al. | |
| 10,949,757 B2 | 3/2021 | Turgeman | |
| 10,970,394 B2 | 4/2021 | Kedem et al. | |
| 11,055,395 B2 | 7/2021 | Novik et al. | |
| 2009/0064337 A1 | 3/2009 | Chien | |
| 2011/0093773 A1 | 4/2011 | Yee | |
| 2011/0112931 A1* | 5/2011 | Hu | G06Q 30/02 705/26.35 |
| 2014/0281901 A1 | 9/2014 | Mostowy et al. | |
| 2016/0306974 A1* | 10/2016 | Turgeman | H04L 63/08 |
| 2016/0307201 A1* | 10/2016 | Turgeman | G06F 21/316 |
| 2017/0195356 A1* | 7/2017 | Turgeman | H04L 63/08 |
| 2018/0103047 A1* | 4/2018 | Turgeman | G06Q 20/4014 |

OTHER PUBLICATIONS

International Appl. No. PCT/US2020/049040, International Search Report and Written Opinion dated Nov. 30, 2020, 19 pages.

* cited by examiner

SYSTEMS AND METHODS FOR DETECTING LOCATIONS OF WEBPAGE ELEMENTS

CROSS REFERENCE TO RELATED APPLICATIONS

The present application is a continuation application of U.S. patent application Ser. No. 16/559,020, filed Sep. 3, 2019, and is incorporated in reference in its entirety.

BACKGROUND

The present specification generally relates to automatic detection of locations of webpage elements within a webpage, and more specifically, to detecting locations of various webpage elements within the webpage based on analyzing programming code of the webpage according to various embodiments of the disclosure.

RELATED ART

Many websites include webpage elements associated with other websites (e.g., links to third-party websites) that offer auxiliary content and/or services to end users. For example, a merchant website may present, in a merchandise checkout webpage, links to third-party digital payment service providers, such as PAYPAL®, APPLE PAY®, and other payment service providers for facilitating electronic payment transactions for purchases arising from the merchant website. The positions of the links that appear on the merchant webpage when the merchant webpage is rendered on a device of an end user may affect one or more of: a probability of the end user selecting one of the links (e.g., selecting one of the payment service providers, etc.), a risk associated with the transaction, and other factors, that may be consequential for the third-party payment service providers.

Furthermore, a third-party digital payment service provider may have an existing agreement with the merchant, specifying that a link associated with the third-party digital payment service provider should be presented at a specific position within the checkout webpage (e.g., to appear at a first position among all payment options presented in the checkout webpage, etc.). However, the layout (or formatting) rules for the webpage (e.g., a layout structure and/or CSS code associated with the webpage) may cause the link to be rendered at a different position (either intentionally or inadvertently done by the merchant). It is often difficult to detect the positions of the webpage elements in various webpages, except by rendering the webpages on a device and manually checking the rendered webpages. Thus, there is a need for automatically detecting positions of webpage elements within a webpage based on analyzing programming code of the webpage.

Figure 1:
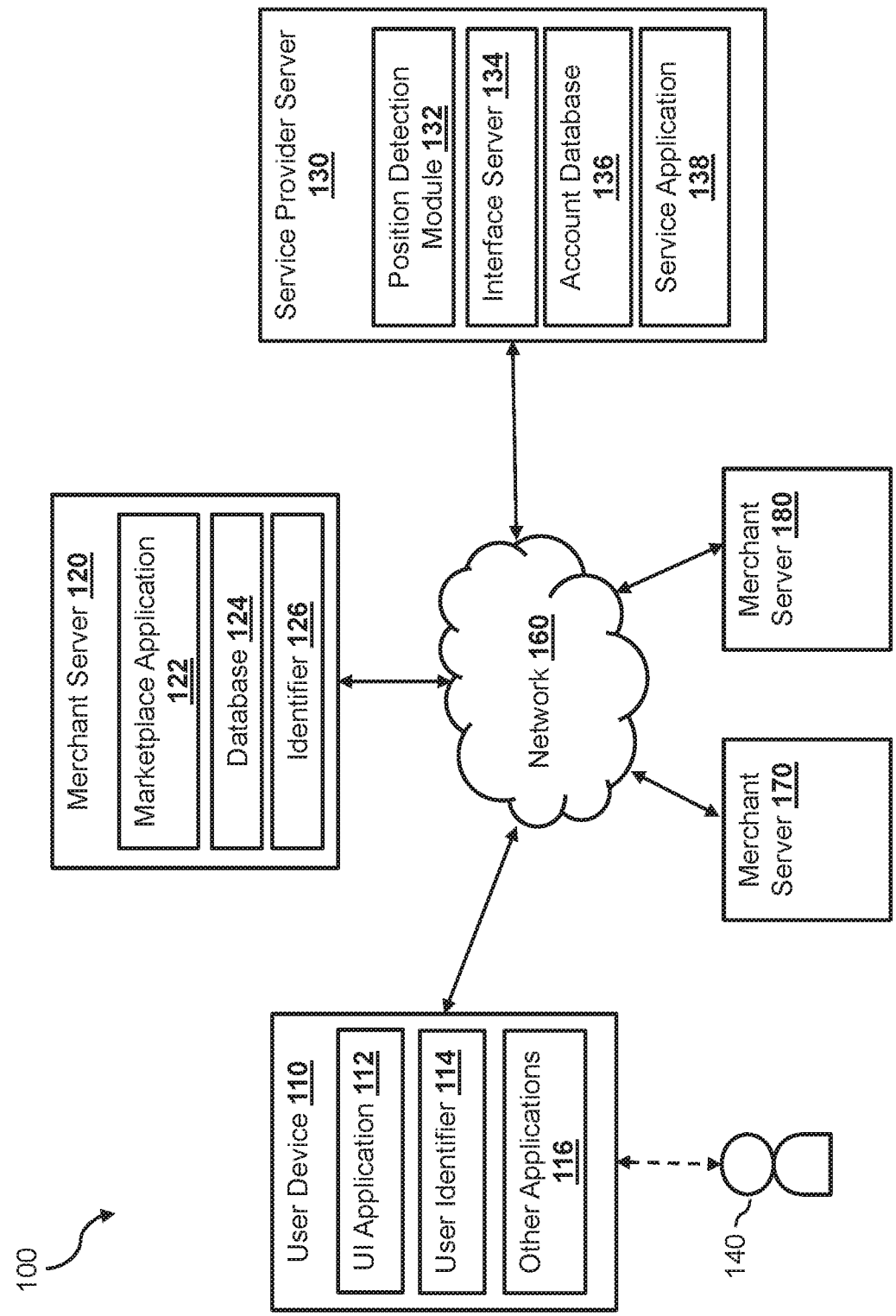
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for automatically detecting positions of various webpage elements within a webpage when the webpage is rendered, based on analyzing the programming code of the webpage. In some embodiments, a position detection system may determine an order (or relative positions) in which webpage elements within a group of related webpage elements appear within the webpage when the webpage is rendered, based on analyzing the programming code of the webpage. The position detection system may first access a webpage that includes various webpage elements. The webpage may be a transaction checkout webpage associated with a merchant website, and may include webpage elements (e.g., links) associated with digital payment service providers. The position detection system may provide a web crawler, e.g., a software program that access data over the Internet, to access one or more transaction checkout webpages (associated with one or more merchants) by providing network addresses (e.g., uniform resource locator (URL) addresses, etc.) associated with the one or more transaction checkout webpages to a network (e.g., via a web browser application). Alternatively, the position detection system may access the transaction checkout webpage by initiating a transaction checkout process at a merchant website. For example, the web crawler may emulate an end-user initiating a transaction with a merchant website. The web crawler may first access the merchant website (e.g., a homepage or a portal of the merchant website), arbitrarily select one or more offerings from the merchant website for purchase (e.g., by adding the one or more offerings to an electronic shopping cart of the merchant website), and then initiate the checkout process via the merchant website (e.g., selecting a checkout option on the merchant website) to access a transaction checkout page of the merchant website.

The position detection system may then obtain programming code associated with the webpage (e.g., by downloading the source code of the transaction checkout webpage). The position detection system may analyze the programming code associated with the webpage to identify a group of related webpage elements within the webpage. In the example where the webpage is the transaction checkout webpage of a merchant website, the group of related webpage elements may be associated with payment options that an end user of the merchant website may select for performing a payment of a transaction with the merchant website.

In some embodiments, the position detection system may identify webpage elements that are part of (or related to) one or more groups within the webpage based on the programming code. For example, the position detection system may parse the programming code of the webpage and extract webpage elements within the webpage that may be part of one or more groups based on a grouping tag, such as a container tag, a list tag, etc., included in the webpage elements. In one embodiment, the position detection system may determine that a webpage element is part of a group when the webpage element includes a grouping tag. Examples of grouping tags (for webpages that are developed using Hypertext Markup Language (HTML)) may include a <DIV> tag, a <LI> tag, a <DT> tag, and a <LABEL> tag.

Since webpage elements that are part of the same group may share a common programming code structure, after identifying all webpage elements that are part of one or more groups within the webpage, the position detection system may determine related webpage elements (e.g., which webpage elements are part of the same group) by analyzing the programming code structures of the webpage elements. In some embodiments, the position detection system may remove (e.g., strip away) user-provided content (e.g., text, image links, multi-media links, etc.) and variable attribute values (e.g., "input id" values, "input value" values, "label for" values, etc.) that are not part of the programming structures within the webpage elements. The user-provided content and variable attribute values may differ among different webpage elements, even if they are part of the same group. After removing the user-provided content and variable attribute values from the webpage elements, the remaining programming code (e.g., stripped programming code) may reveal the programming structures of the webpage elements. As such, the position detection system may compare the stripped programming code of the webpage elements to determine which webpage elements share a common programming structure, and thus are related to each other (e.g., part of a group). For example, the position detection system may determine that certain webpage elements within the webpage are related to each other when the webpage elements have an identical or a similar programming structure (e.g., shared portions of the stripped programming code above a predetermined threshold (e.g., 90%, 95%, etc.)).

In some embodiments, after dividing the webpage elements into one or more groups, the position detection system may further eliminate groups that include only one webpage element (e.g., webpage elements that do not share programming structures with any other webpage elements within the webpage). From the remaining groups of webpage elements, the position detection system may determine at least one group that is related to a target subject matter (e.g., payment options). For example, the position detection system may parse the programming code (e.g., the original, unstripped version) of the remaining groups of webpage elements to search for one or more keywords related to the target subject matter (e.g., "payment," "pay," "pay_method," etc.). When one or more keywords related to the target group appear in the programming code of the webpage elements in a group, the position detection system may determine that the group of webpage elements is related to the target subject matter. In other embodiments, keywords may be weighted, such that certain keywords that have a higher likelihood of being related to the target subject matter are weighted more than keywords having a lower likelihood. A determination whether the corresponding group of webpage elements is related to the target subject matter may then be based on the keywords meeting a threshold.

In some embodiments, the position detection system may determine whether a group of webpage elements is associated with the target subject matter by submitting one or more characteristics of the programming structure associated with the group of webpage elements to a machine learning model, that has been trained to determine whether a programming structure is associated with the target subject matter. The characteristics may include at least one of: the types of tags used in the programming structure, an order of the tags, a number of the same type of tags used in the programming structure, how many nested levels within the programming structure, how tags are nested within tags for the programming structure, etc.

Once the group of webpage elements related to the target subject matter is determined, a particular webpage element of interest to the position detection system may be detected within the group. For example, the particular webpage element may be a link associated with a particular service provider. Furthermore, the position detection system may determine relative positions of appearances of the webpage elements within the group (e.g., an order, such as from left to right or from top to bottom, etc.) when the webpage is rendered (e.g., presented on a web browser), and/or a relative position of an appearance of the particular webpage element among the webpage elements within the group when the webpage is rendered. In some embodiments, the position detection system may parse the group of webpage elements and search for one or more keywords associated with the particular webpage element. For example, if the particular webpage element of interest to the position detection system is a payment option link associated with PAYPAL®, the position detection system may search for the word "paypal" within the webpage elements in the group. The position detection system may then determine that the particular webpage element is of interest to the position detection system when the programming code associated with the particular webpage element includes the word "paypal."

In some embodiments, the position detection system may generate (e.g., build) a document object model (DOM) tree based on the programming code of the webpage. The DOM tree may include nodes, where a node (or a group of nodes) in the DOM tree corresponds to a webpage element within the webpage (e.g., the tags associated with the webpage element). For example, the root node (or the root group of nodes) in the DOM tree may correspond to a root webpage element (e.g., a title) within the webpage. The DOM tree may have multiple levels of nodes, where each level corresponds to a tag level within the programming code. Thus, when the webpage has a nested structure (e.g., one or more nested tags), the position detection system may generate the DOM tree to have multiple levels, where each nested structure is represented by a level within the DOM tree. As such, the DOM tree may represent how the webpage elements (e.g., text, images, multi-media content, user interface elements such as a link, a button, a check-box, a text box, a radio button, etc.) are presented when the webpage is rendered by a software application (e.g., a web browser).

In some embodiments, the position detection system may determine an order in which the group of related webpage elements is presented when the webpage is rendered by traversing the DOM tree. For example, the position detection system may traverse the DOM tree in a breadth-first search manner, and the order in which the nodes are traversed may be used to determine the order in which the corresponding webpage elements are presented on the webpage when the webpage is rendered. Thus, by determining an order in which the nodes (including the nodes corresponding to the group of webpage elements) are reached based on traversing the DOM tree using a breadth-first search algorithm, the position detection system may determine an order in which the related webpage elements in the group are presented on the webpage when the webpage is rendered, and the relative position of the particular webpage element among the group of webpage elements within the order.

In some embodiments, the position detection system may apply the formatting rules (e.g., CSS code) associated with the webpage to the webpage elements before building and/or traversing the DOM tree. Upon applying the formatting rules to the webpage elements, the position detection system may also determine whether each of the webpage elements is within a viewport of the webpage (e.g., is visible on the webpage when the webpage is rendered). Thus, not only can the position detection system determine an order of the webpage elements presented on the webpage, the position detection system may also determine whether the particular webpage element (or the entire group of webpage elements) is visible to end-users (e.g., within the viewport of the webpage) when the webpage is rendered.

Upon determining that the particular webpage element is visible to end-users and determining the relative position of the particular webpage element among the group of webpage elements, the position detection system may compare the determined position of the particular webpage to a predetermined position. The predetermined position may be a position agreed upon between the merchant and the service provider for presenting the particular webpage element on the merchant website, or a desirable position by the service provider associated with the position detection system. If the position detection system determines that the position of the particular webpage element on the webpage determined based on analyzing the programming code of the webpage is different (e.g., higher or lower) than the predetermined position, the position detection system may transmit an alert to a device associated with the service provider. In some embodiments, as discussed above, the web crawler may be configured to crawl through a network (e.g., the Internet) to obtain various webpages associated with different entities (e.g., transaction checkout webpages associated with different merchant websites) that include the particular webpage element. The position detection system may then analyze the programming code of the webpages to determine, for each merchant website, a relative position of the particular webpage element (e.g., a particular payment option) among the group of webpage elements (e.g., a group of payment options). The position detection system may generate a report indicating the merchant websites that present the particular webpage element at the predetermined position and the merchant websites that present the particular webpage element at a different position. Furthermore, the position detection system may also determine correlations between the relative position of the webpage element and a metric that may be a number (or frequency), a ratio, or other metrics of transactions for which the end-users select the particular payment option for the transactions. In some embodiments, the position detection system may feed the data into a machine learning model to determine an optimal position (e.g., the position of the webpage element that would produce the maximum number of selection of the particular payment option).

In some embodiments, the position detection system is part of a risk assessment system for a service provider. In some embodiments, the particular webpage element may be associated with initiating an electronic transaction request with the service provider (e.g., initiating an electronic payment request, etc.). Thus, when an end user selects the particular webpage element (e.g., a button, a link, etc.) that appears on the webpage (e.g., a transaction checkout webpage), the web browser directs the end user to a website associated with the service provider. The risk assessment system of the service provider may then use the position detection system to determine a relative position of the particular webpage element among the group of related webpage elements that appear on the transaction checkout webpage when the transaction checkout webpage is rendered and may use the determined relative position to determine a risk associated with the transaction request. The risk assessment system may authorize or deny the transaction request based on the risk.

FIG. 1 illustrates an electronic transaction system 100, within which the position detection system may be implemented according to one embodiment of the disclosure. The electronic transaction system 100 includes a service provider server 130, merchant servers 120, 170, and 180, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with any one of the merchant servers 120, 170, and 180 via websites hosted by, or mobile applications associated with, the merchant servers 120, 170, and 180, respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to conduct electronic transactions (e.g., online payment transactions, etc.) with the merchant servers 120, 170, and 180, and/or the service provider server 130 over the network 160. In one aspect, purchase expenses may be directly and/or automatically debited from an account related to the user 140 via the user interface application 112.

In one implementation, the user interface application 112 includes a software program (e.g., a mobile application) that provides a graphical user interface (GUI) for the user 140 to interface and communicate with the service provider server 130 and/or the merchant servers 120, 170, and 180 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, when the a transaction checkout webpage associated with any one of the merchant servers 120, 170, or 180 (that includes a group of website elements, such as links to different service provider servers including the service provider server 130) is presented on the UI application 112 of the user device 110, the user 140 may use the input component to provide a selection of any one of the website elements presented on the transaction checkout webpage. Furthermore, the user 140 may also use the input component to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. In one example, the marketplace application 122 may include an interface server (e.g., a web server, a mobile application server, etc.) that provides an interface (e.g., a webpage) for the user 140 to interact with the merchant server 120. The merchant website hosted by the merchant server 120 may include a transaction checkout webpage, which may include webpage elements (e.g., links, etc.) for initiating payment services with the service provider server 130 and possibly other service providers. The user 140 who initiates a transaction with the merchant server 120 may be presented with such a transaction checkout webpage, through which the user 140 may select a payment method with any one of the payment service providers (e.g., via selecting one of the webpage elements on the webpage). The merchant may also have an account with the service provider server 130. Each of the merchant servers 170 and 180 may include similar components as the merchant server 120 and may provide similar services to the user 140 as the merchant server 120.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the data server 134 may store a log-in page and is configured to serve the log-in page to users for logging into user accounts of the users to access various service provided by the service provider server 130. The data server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

In various embodiments, the service provider server 130 includes a position detection module 132 that implements the position detection system as discussed herein. The position detection module 132 is configured to determine a relative position of an appearance of a particular webpage element within a webpage (e.g., hosted by anyone of the merchant servers 120, 170, and 180) when the webpage is rendered. For example, the position detection module 132 may obtain a webpage from the merchant servers 120, 170, or 180, and may analyze the programming code of the webpage. Based on the analyzing of the programming code, the position detection module 132 may determine a relative position of an appearance of a particular webpage element (e.g., a link associated with the service provider server 130) among related webpage elements (e.g., links associated with other similar service provider servers) when the webpage is rendered. The position detection module 132 may transmit alerts to the service provider server 130 based on the determined position (e.g., when the determined position is different from a predetermined position for the particular webpage element). The position detection module 132 may also determine correlations between positions of an appearance of the particular webpage element and certain web-related metrics, such as a hit ratio of the particular webpage element, a usage ratio of the service provider server 130, etc. Furthermore, when the particular webpage element is associated with initiating a transaction request with the service provider server 130, the position detection module 132 may also use the determined position to assess a risk of the transaction request, and to facilitate a decision by the service provider 130 to authorize or deny the transaction request.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the profile matching module 132 to match profiles to the entity. In certain embodiments, account information also includes user purchase profile information such as account funding options and payment options associated with the user, payment information, receipts, and other information collected in response to completed funding and/or payment transactions.

User profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items, which can also be used to determine whether a request is valid or fraudulent.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

Figure 2:
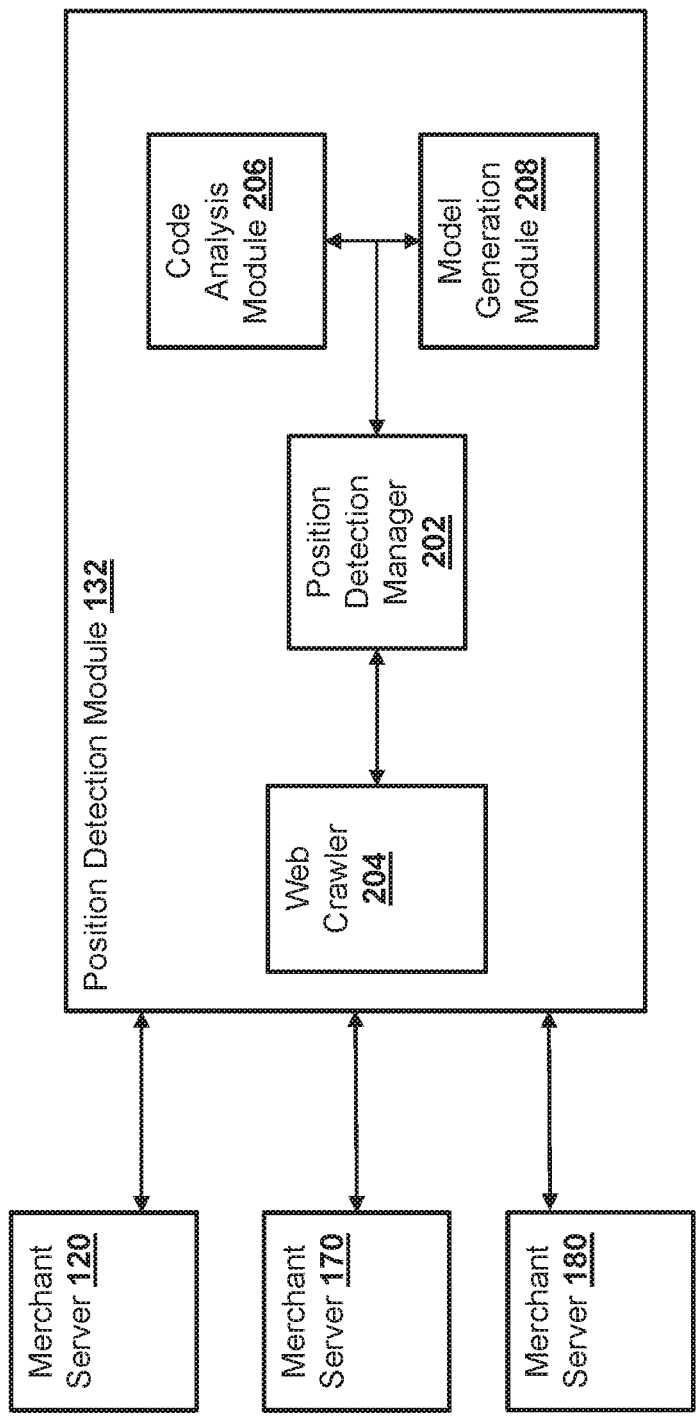
FIG. 2 is a block diagram illustrating a position detection module according to an embodiment of the present disclosure.

FIG. 2 illustrates a block diagram of the position detection module 132 according to an embodiment of the disclosure. The position detection module 132 includes a position detection manager 202, a web crawler 204, a code analysis module 206, and a model generation module 208. The position detection manager 202 may use the web crawler 204 to access webpages that include a particular webpage element (e.g., a link to the service provider server 130 for submitting a request for performing electronic transactions). For example, if the particular webpage element is a payment option link associated with the service provider server 130, the web crawler 204 may access various merchant websites via the network 160 (such as merchant websites associated with the merchant servers 120, 170, and 180), and may emulate an end user (e.g., a human user) initiating a transaction with the merchant website by selecting one or more offerings from the merchant website for purchase and initiating a checkout process with the merchant website. Once the web crawler 204 accesses the webpage that includes the particular webpage element (e.g., a transaction checkout webpage of a merchant website that includes a link to the service provider server 130), the web crawler 204 may obtain (e.g., downloads) source programming code of the webpage.

The position detection manager 202 may then use the code analysis module 206 to analyze the programming code of the webpage using techniques disclosed herein. In some embodiments, to assist the code analysis module 206 in analyzing the programming code of the webpage, the model generation module 208 may generate a DOM tree of the webpage based on the programming code. The code analysis module 206 may traverse the DOM tree to determine an order in which related webpage elements (webpage elements, including the particular webpage elements, that are associated with a target subject matter such as payment options) are presented on the webpage when the webpage is rendered and/or a relative position of the particular webpage elements among the related webpage elements.

Figure 3:
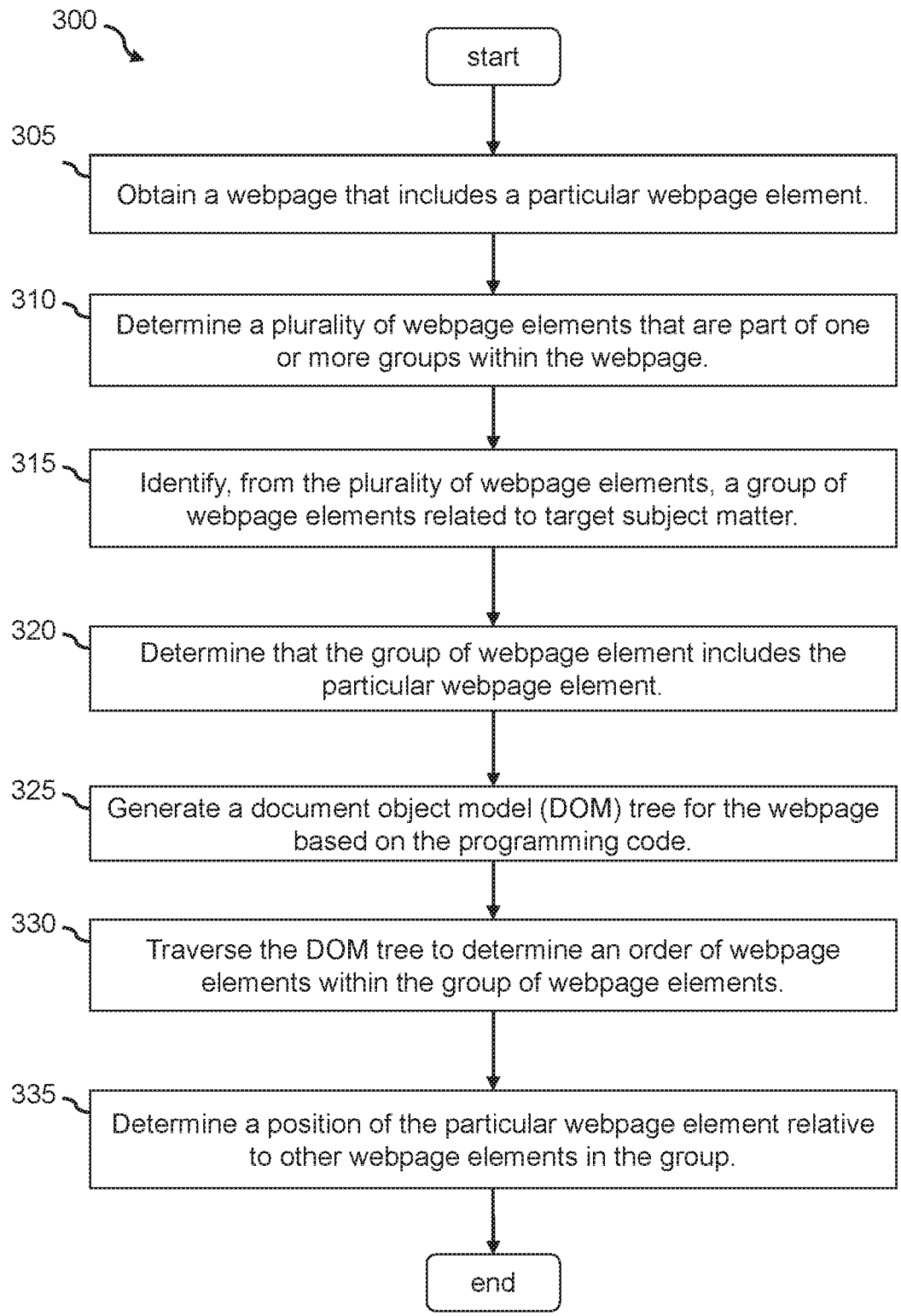
FIG. 3 is a flowchart showing a process of automatically detecting positions of webpage elements within a webpage according to an embodiment of the present disclosure.

FIG. 3 illustrates a process 300 for determining a relative position of an appearance of a particular webpage element among related webpage elements within a webpage when the webpage is rendered according to various embodiments of the disclosure. In some embodiments, the process 300 may be performed by the position detection module 132 of the service provider server 130. The process 300 begins by obtaining (at step 305) a webpage that includes the particular webpage element. The particular webpage element may be of interest to the service provider server 130. For example, the particular webpage element may be a link to the service provider server 130, such as a link for submitting a transaction request to the service provider server 130. In one example, the link may include a web address (e.g., a URL address, an IP address, etc.) that points to the interface server 134 of the service provider server 130. In some embodiments, the link is provided to the merchant websites (associated with the merchant servers 120, 170, and 180) to enable end users of the merchant websites to initiate a transaction request (e.g., a request to perform an electronic payment transaction) with the merchant websites. The service provider associated with the service provider server 130 may wish to determine (or verify) locations of the particular webpage element within various third-party webpages (e.g., transaction checkout webpages of the merchant websites), and/or the relative positions of the particular webpage element among related webpage elements (e.g., links associated with other similar service provider servers such as other payment options) that appear at the various third-party webpages.

In some embodiments, the position detection module 132 may use the web crawler 204 to access the various third-party webpages. In one example, the web crawler 204 may obtain network addresses (e.g., uniform resource locators (URLs), Internet Protocol (IP) addresses, etc.) associated with the third-party webpages, and access the third-party webpages by submitting a request for content based on the network addresses (e.g., via an application such as a web browser). However, some of these third-party webpages, such as transaction checkout webpages of merchant websites, may not be accessible via network addresses, as they may be dynamically generated based on input from one or more webpages of merchants associated with a transaction checkout flow. As such, in another example, the web crawler 204 may first access a website of a merchant (e.g., a homepage or a main portal of the merchant, such as http://www.amazon.com). Once the merchant website is accessed, the web crawler 204 may emulate an end user (e.g., a human user) initiating a transaction checkout flow of the merchant by selecting (e.g., randomly selecting) one or more merchandises from the merchant website and adding the one or more merchandises to an electronic cart of the merchant website. In some embodiments, the web crawler 204 may parse the programming code of the merchant website to identify the one or more offerings and to make one or more requests to the merchant website to add the one or more offerings to the electronic cart (e.g., by sending web requests to the merchant servers 120, 170, or 180). By initiating the transaction checkout workflow based on the one or more offerings, the merchant servers may provide the web crawler 204 access to the webpages that include the particular webpage element.

Figure 4:
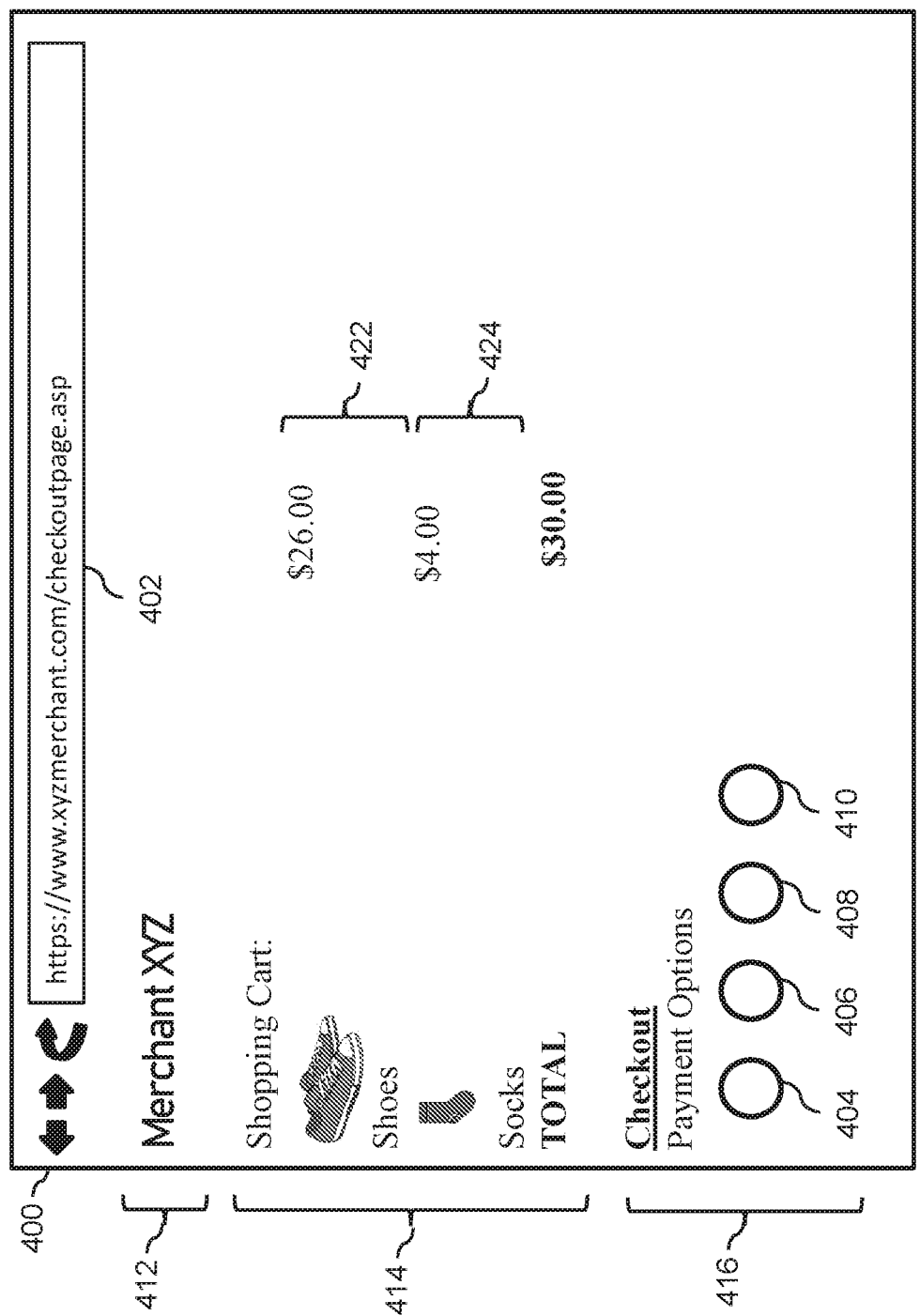
FIG. 4 illustrates an exemplary webpage having groups of related webpage elements according to an embodiment of the present disclosure.

FIG. 4 illustrates an example webpage 400 that includes the particular webpage element. In this example, the webpage 400 is a transaction checkout webpage associated with a merchant called 'XYZ,' as indicated by the network address 402 associated with the webpage 400. As shown, the webpage 400 includes a merchant logo 412 associated with the merchant, a transaction summary section 414, and a payment option section 416. The transaction summary section 414 in this example includes webpage elements 422 and 424, which show that the transaction is for a purchase of a pair of shoes that costs $26 and a pair of socks that costs $4, which brings the total of the transaction to be $30. In the payment option section 416, multiple webpage elements 404-410 are presented. Each of the webpage elements 404-410 may be a link to initiate a payment transaction service with a payment service provider. In this example, the webpage element 406 (the particular webpage element) may be a link to initiate a payment transaction service with the service provider server 130, while the webpage elements 404, 408, and 410 may be links to initiate a payment transaction service with other service provider servers (e.g., different from the service provider server 130).

Once a webpage is accessed, the process 300 determines (at step 310) a plurality of webpage elements that are part of one or more groups within the webpage. In some embodiments, the web crawler 204 may obtain (e.g., download) the programming code associated with the webpage (e.g., the webpage 400). The position detection manager 202 may use the code analysis module 206 to analyze the programming code to determine different webpage elements within the webpage 400. As defined herein, a webpage element is a standalone presentable component within a webpage, that may include a text component, an image component, a multi-media (e.g., a video clip, an audio clip) component, an interactive component such as a link (e.g., a hyperlink), a form, a selection button (e.g., a radio button, a checkbox, etc.), and any combinations thereof. If the webpage 400 is developed using Hypertext Markup Language (HTML), a webpage element may be encapsulated within tags (e.g., a tag and a corresponding end tag).

In some embodiments, the code analysis module 206 may parse the programming code of the webpage 400 and identify webpage elements within the webpage 400 that may be part of one or more groups based on a programming structure of the webpage elements and programming tags included in the webpage elements. Using the example webpage 400 shown in FIG. 4, the code analysis module 206 may identify, from parsing the programming code of the webpage 400, different webpage elements within the webpage 400. In some embodiments, the code analysis module 206 may identify webpage elements based on content that is either associated with displayable text and/or based on content that is associated with (e.g., appears immediate after) tags in the code. For example, the code analysis module 206 may identify a webpage element corresponding to the merchant logo 412 (which is an image, and is associated with an image tag such as '<img>' within the code), the webpage element 422 corresponding to the purchase of the pair of shoes 422 (e.g., including an image of the pair of shoes and a price of the shoes, the webpage element 422 is wrapped between a pair of tags such as '<dl>' and '</dl>'), the webpage element 424 corresponding to the purchase of the pair of socks 424 (e.g., including an image of the pair of socks and a price of the socks, the webpage element 424 is wrapped between a pair of tags such as '<dl>' and '</dl>'), and the webpage elements 404-410 corresponding to links associated with different payment service providers (e.g., each of the webpage elements 404-410 is wrapped between a pair of tags such as '<dl>' and '</dl>'). However, not all of the webpage elements identified in the webpage 400 are part of a group. In this example, the webpage element corresponding to the merchant logo 412 is a standalone webpage element that is not related to any other webpage elements within the webpage 400 (e.g., not part of any group of webpage elements as it is not associated with any one of the group tags, as will be explained in detail below). On the other hand, the webpage elements 422 and 424 corresponding to the merchandises (e.g., the shoes and the socks) are related to each other (and part of a group) as all of them represent merchandises that are involved in the transaction. Similarly, the webpage elements 404-410 are related to each other (and part of a group) as they represent different payment options for the end user of the merchant website.

In some embodiments, the code analysis module 206 may identify webpage elements that may be part of one or more groups based on a grouping tag included within the portions of programming code corresponding to the webpage elements. A grouping tag (e.g., a container tag, a list tag, etc.) included within the portion of programming code corresponding to a webpage element may indicate that the webpage element is part of one or more groups. Thus, the code analysis module 206 may determine that a webpage element is part of a group when the webpage element includes a grouping tag (e.g., encapsulated by the grouping tag and a corresponding end tag). Examples of grouping tags, for webpages that are developed using Hypertext Markup Language (HTML), may include a <DIV> tag, a <LI> tag, a <DT> tag, and a <LABEL> tag.

Figure 5:
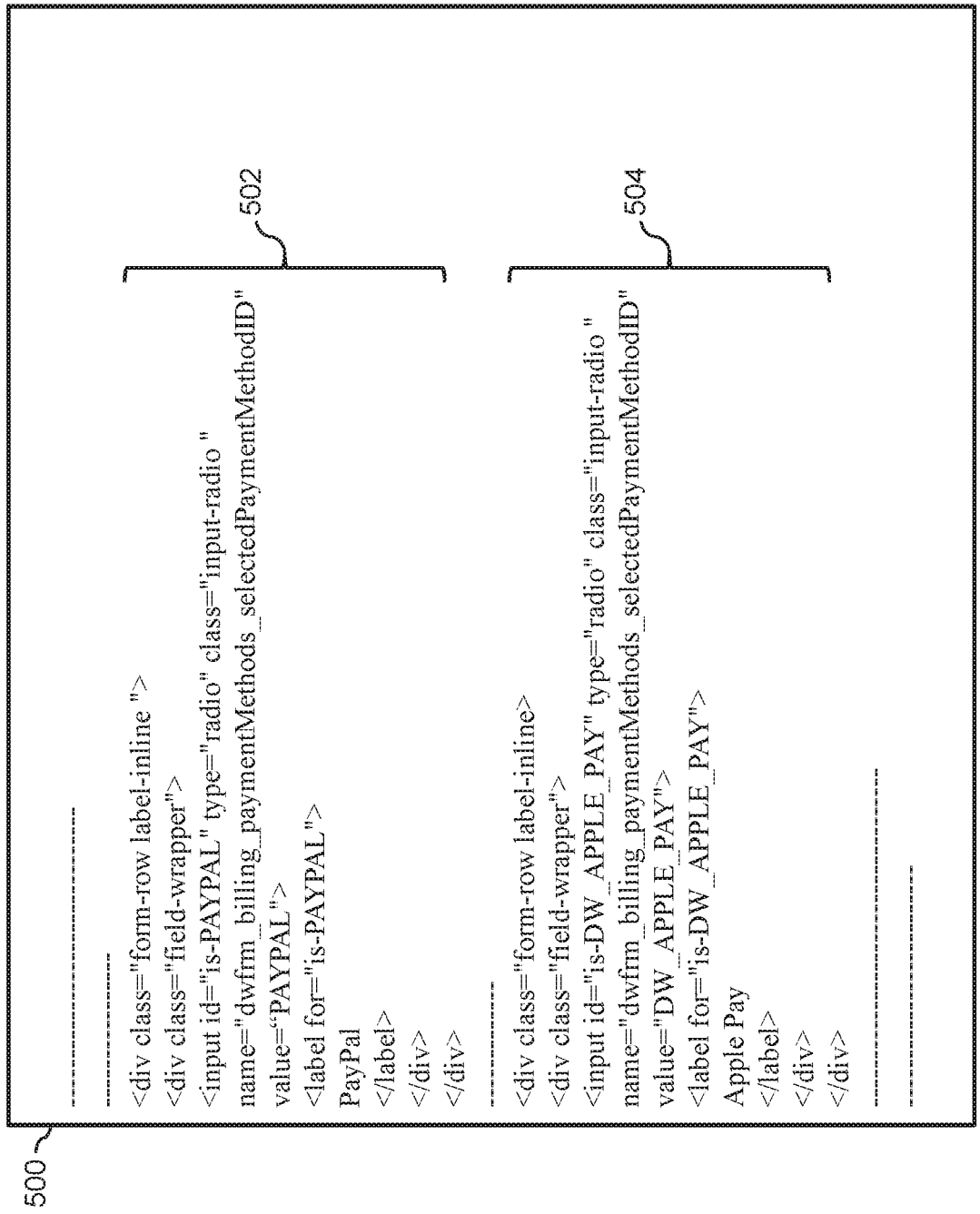
FIG. 5 illustrates exemplary programming code associated with a webpage according to an embodiment of the present disclosure.

FIG. 5 illustrates a section of programming code 500 associated with the webpage 400. Specifically, the section of programming code 500 includes a portion of programming code 502 corresponds to the webpage element 406 and a portion of programming code 504 corresponds to the webpage element 408. As shown, each of the portions of programming code 502 and 504 includes a grouping tag (e.g., a <DIV> tag) and/or encapsulated within a grouping tag (e.g., a <DIV> tag) and a corresponding end tag (e.g., a </DIV> tag). Thus, by identifying webpage elements that include a grouping tag in the corresponding portions of programming code, the code analysis module 206 may identify webpage elements 422, 424, 404, 406, 408, and 410 that may be part of one or more groups.

Referring back to FIG. 3, the process 300 then identifies (at step 315), from the plurality of webpage elements, a group of webpage elements related to a target subject matter. For example, the code analysis module 206 may divide the webpage elements into one or more groups of related webpage elements, where the webpage elements in each group of webpage elements are related to each other and associated with a subject matter (e.g., payment options, merchandises involved in a transaction, etc.). Since webpage elements that are part of the same group may share a common programming code structure, after identifying all webpage elements within the webpage 400 that may be part of one or more groups, the code analysis module 206 may determine related webpage elements by analyzing the programming code structures of the portions of programming code corresponding to the webpage elements.

In some embodiments, the code analysis module 206 may first extract the portions of programming code corresponding to the webpage elements that are part of one or more groups (e.g., the webpage elements 422, 424, 404, 406, 408, and 410). The code analysis module 206 may then remove (e.g., strip away) parts of the portions of the programming code that are not part of a programming structure (not standard tag language, not recognizable by a software interpreter/compiler of a programming language), such as user-provided content data (e.g., text, image file links, etc.) and variable attribute values (e.g., "input id" values, "input value" values, "label for" values, etc.) within tags. In the example illustrated in FIG. 5, the parts of the programing code that are not part of a programming structure may include the text data (e.g., "PayPal" for the portion of programming code 502 and "Apple Pay" for the portion of programming code 504, the "input id" values within the <INPUT> tags (e.g., "is-PAYPAL" for the portion of programming code 502 and "is-DW_APPLE_PAY" for the portion of programming code 504), the "input value" values within the <INPUT> tags (e.g., "PAYPAL" for the portion of programming code 502 and "DW_APPLE_PAY" for the portion of programming code 504), and the "label for" values within the <LABEL> tags (e.g., "is-PAYPAL" for the portion of programming code 502 and "is-DW_APPLE_ PAY" for the portion of programming code 504). These are the values that may be arbitrarily inserted into the programming code by the developer(s) of the webpage 400 and are not related to the programming structure of the programming code.

After removing the user-provided content and the variable attribute values from the webpage elements, the remaining programming code (e.g., stripped programming code) may reveal programming structures of the webpage elements. For example, the stripped programming code may include HTML, tags (e.g., <DIV>, <LABEL>, etc.), code that specify one or more types of the webpage elements (e.g., "DIV CLASS='FIELD_WRAPPER'," "INPUT TYPE='RADIO'," "INPUT CLASS='INPUT_RAIO'," etc.), and a structure of the tags (e.g., how different tags are nested). The code analysis module 206 may compare the stripped programming code of the webpage elements to determine which webpage elements are related (e.g., part of a group). For example, the code analysis module 206 may determine that webpage elements are related to each other when the webpage elements have an identical or a similar programming structure (e.g., shared portions of the stripped programming code above a threshold (e.g., 90%, 95%, etc.)). After removing the user-provided content and the variable attribute values from the portions of programming code 502 and 504, the code analysis module 206 may determine that the stripped portions of programming code 502 and 504 are identical. For example, as shown in FIG. 5, each of the stripped portions of the programming code 502 and 504 would include a first structure wrapped between a pair of <DIV> tags, a second <DIV> structure wrapped between another pair of <DIV> tags that is nested within the first structure, and a third structure corresponding to an input radio button (e.g., associated with an <INPUT> tag) and a fourth structure wrapped between a pair of <LABEL> tags, both of which nested within the second structure. Thus, the code analysis module 206 may determine that the webpage elements 406 and 408 (corresponding to the portions of programming code 502 and 504, respectively) belong to the same code because they share the same programming structure.

The code analysis module 206 may use the same techniques to compare the programming structures of all of the webpage elements within the webpage 400. Based on the comparing of stripped portions of programming code, the code analysis module 206 may determine that the webpage elements 422 and 424 belong to a first group based on determining that the portions of programming code corresponding to the webpage elements 422 and 424 share a first programming structure, and that the webpage elements 404-410 belong to a second group based on determining that the portions of programming code corresponding to the webpage elements 404-410 share a second programming structure.

In some embodiments, after dividing the webpage elements of the webpage 400 into one or more groups based on the programming structure, the code analysis module 206 may further eliminate groups that include only one webpage element (e.g., webpage elements that do not share programming structures with any other webpage elements within the webpage). In the example illustrated in FIG. 4, both groups of webpage elements include two or more webpage elements. However, consider an example where only one merchandise (e.g., the pair of shoes associated with the webpage element 422) is involved in the transaction. The webpage element 422 may still include a grouping tag since the programming code is automatically generated, with the assumption that there may be more than one merchandise or offering to be listed on the webpage 400. Thus, even though after identifying the webpage element 422 as part of a group (e.g., based on determining that the webpage element 422 includes a grouping tag such as <DIV>), the code analysis module 206 may determine that the webpage element is an orphan webpage element that is not related to any other webpage element based on comparing the programming structure of the webpage element 422 to the programming structures of other webpage elements in the webpage 400 (e.g., determining that the webpage element 422 does not share a programming structure with any other webpage elements in the webpage 400). Thus, the code analysis module 206 may eliminate the group of webpage elements that includes the webpage element 422.

From the remaining groups of webpage elements, the code analysis module 206 may determine at least one group that is related to a target subject matter (e.g., payment options). For example, the position detection system may parse the portions of programming code (e.g., the original, unstripped version) corresponding to the remaining groups of webpage elements to search for one or more keywords related to the target subject matter (e.g., "payment," "pay," "paymentmethod," etc.). When one or more keywords related to the target group appear in the portions of the programming code corresponding to a group of the webpage elements, the code analysis module 206 may determine that the group of webpage elements is related to the target subject matter. In some embodiments, the code analysis module 206 may determine that the group of webpage elements is related to the target subject matter when the one or more keywords are found in a portion of programming code corresponding to at least one webpage element in the group. In some embodiments however, the code analysis module 206 may determine that the group of webpage elements is related to the target subject matter only when the one or more keywords are found in the portions of programming code corresponding to each and every webpage element in the group. Referring back to FIG. 5, the code analysis module 206 may search through the programming code of the webpage 400 and may find the keywords "payment" and "paymentmethod" in the portions of programming code corresponding to the webpage elements 404-410, which are part of the second group of webpage elements. Thus, the code analysis module 206 may determine that the second group of webpage elements (including the webpage elements 404-410) is related to the target subject matter.

In some embodiments, the code analysis module 206 may determine whether a group of webpage elements is associated with the target subject matter by submitting one or more characteristics of the programming structure associated with the group of webpage elements to a machine learning model, that has been trained to determine whether a programming structure is associated with the target subject matter. The characteristics may include at least one of: the types of tags used in the programming structure, an order of the tags, a number of the same type of tags used in the programming structure, how many nested levels within the programming structure, how tags are nested within tags for the programming structure, etc.

After determining a group of webpage elements within the webpage that is related to the target subject matter, the process 300 determines (at step 32) that the group of webpage elements related to the target subject matter includes a particular webpage element of interest. For example, the position detection manager 202 may determine whether the second group of webpage elements includes a link to the service provider server 130. In some embodiments, the position detection manager 202 may use the code analysis module 206 to search the portions of programming code corresponding to the second group of webpage elements for one or more keywords related to the service provider server 130, such as "PayPal," "paypal.com," etc. Referring back to FIG. 5, the code analysis module 206 may determine that the webpage element 404 is the particular webpage element of interest as the portion of programming code 502 corresponding to the webpage element 404 includes the keyword "PAYPAL."

In some embodiments, the position detection manager 202 may determine a location of the appearance of the webpage element 404 and/or a relative position of the webpage element 406 among other related webpage elements (e.g., the webpage elements 404, 408, and 410 that are part of the same group) based on analyzing the programming code of the webpage 400. Different embodiments may use different techniques to determine the location or relative position of the webpage element 406. In some embodiments, the code analysis module 206 may determine an order in which the webpage elements in the group is presented on the webpage 400 when the webpage is rendered by simply traversing the programming code of the webpage 404 and determining an order in which portions of the programming code corresponding to the webpage elements within the code appear in the programming code. For example, the code analysis module 206 may determine, from a text file associated with the programming code for each webpage element, a character position of a first character in the portion of programming code corresponding to the webpage element. The code analysis module 206 may then determine the order in which the webpage elements are presented on the webpage based on the character positions associated with the webpage elements.

However, some webpages may be complex and may include multiple nested structures (e.g., tags within tags, etc.) and/or layout rules (e.g., CSS code), which makes it difficult to ascertain the presentation layout of a webpage by simply traversing the programming code in a linear manner (e.g., based on the order in which the portions of the programming code appear in the programming code file). Thus, in some embodiments, the code analysis module 206 may use the model generation module 208 to generate a document object model (DOM) tree based on the programming code of the webpage 400. The code analysis module 206 may traverse the DOM tree to determine an order in which the webpage elements 404-410 within the group of webpage elements. Thus, the process 300 generates (at step 325) a document object model (DOM) tree for the webpage based on the programming code, traverses (at step 330) the DOM tree to determine an order of webpage elements within the group of webpage elements, and determines (at step 335) a position of the particular webpage element relative to other webpage elements in the group.

In some embodiments, the model generation module 208 may generate (e.g., build) a document object model (DOM) tree based on the programming code of the webpage 400. A DOM tree is a structure that corresponds to a programming structure (e.g., tag structure) of the webpage 400. The DOM tree may include nodes, where a node (or a group of nodes) in the DOM tree corresponds to a webpage element within the webpage (e.g., the tags and content associated with the webpage element). For example, the root node (or the root group of nodes) in the DOM tree may correspond to a root webpage element (e.g., a title) within the webpage. The DOM tree may have multiple levels of nodes, where each level corresponds to a tag level within the programming code. Thus, when the webpage 400 has a nested structure (e.g., one or more nested tags), the model generation module 208 may generate the DOM tree to have multiple levels, where each nested structure is represented by a deeper level within the DOM tree. As such, the DOM tree may represent how the webpage elements (e.g., text, images, multi-media content, user interface elements such as a link, a button, a check-box, a text box, a radio button, etc.) are presented when the webpage is rendered by a software application (e.g., a web browser).

In some embodiments, the code analysis module 206 may determine an order in which the group of related webpage elements (including the webpage elements 404-410) is presented when the webpage 400 is rendered by traversing the DOM tree. For example, the code analysis module 204 may traverse the DOM tree in a breadth-first search manner, and the order in which the nodes are traversed may be used to determine the order in which the corresponding webpage elements are presented on the webpage 400 when the webpage 400 is rendered. Thus, by determining an order in which the nodes (including the nodes corresponding to the group of webpage elements 404-410) are reached based on traversing the DOM tree using a breath-first search algorithm, the code analysis module 206 may determine an order in which the related webpage elements 404-410 in the group are presented on the webpage 400 when the webpage 400 is rendered, and the relative position of the particular webpage element (e.g., the webpage element 406) among the group of webpage elements.

In some embodiments, the code analysis module 206 may apply any formatting rules (e.g., CSS rules) associated with the webpage 400 to the webpage elements before building and/or traversing the DOM tree. Upon applying the formatting rules to the webpage elements, the position detection system may also determine whether each of the webpage elements is within a viewport of the webpage 400 (e.g., is visible on the webpage 400 when the webpage 400 is rendered). Thus, not only can the position detection module 132 determine an order of the webpage elements presented on the webpage 400, the position detection system can also determine whether the particular webpage element 406 (or the entire group of webpage elements 404-410) is visible to end-users (e.g., within the viewport of the webpage 400) when the webpage 400 is rendered. In the example illustrated in FIG. 4, the code analysis module 206 may determine that the particular webpage element (e.g., the webpage element 406) is visible to an end user, and is presented at a second position within the group of webpage elements 404-410, before the webpage element 408 and after the webpage element 404, based on traversing the DOM tree.

Upon determining that the particular webpage element 406 is visible to end-users and determining the relative position of the particular webpage element 406 among the group of webpage elements 404-410, the position detection manager 202 may compare the determined position of the particular webpage to a predetermined position. In one example, the predetermined position may be a position agreed upon by the merchant associated with the merchant server (e.g., the merchant server 120, 170, or 180) from which the webpage 400 is obtained for presenting the particular webpage element 406 on its website. In another example, the predetermined position may be a desirable position by a service provider associated with the service provider server 130.

If the position detection manager 202 determines that the position of the particular webpage element 406 on the webpage determined based on analyzing the programming code of the webpage 400 is different (e.g., higher or lower) than the predetermined position, the position detection manager 202 may transmit an alert to a device associated with the service provider server 130. In the example illustrated in FIG. 4, the code analysis module 206 may determine that the particular webpage element 406 associated with the service provider server 130 is located at a second position among the webpage elements 404-410 (e.g., from left to right) within the webpage 400. If the predetermined position for the particular webpage 400 is a first position, the code analysis module 206 may determine that there is an inconsistency between the actual position and the predetermined position of the particular webpage element 404, and may send an alert to a device associated with the service provider server 130.

In some embodiments, as discussed above, the web crawler 204 may be configured to crawl through a network (e.g., the Internet) to obtain webpages associated with different entities (e.g., webpages hosted by merchant servers 120, 170, and 180) that include the particular webpage element (e.g., links to the service provider server 130). The position detection module 132 may then analyze the programming code of the webpages to determine, for each merchant website, a relative position of the particular webpage element (e.g., the link to the server provider server 130) among the group of webpage elements (e.g., a group of payment options) using the techniques described herein. The position detection module 132 may generate a report indicating which merchant websites present the particular webpage element at the predetermined position and which merchant websites present the particular webpage element at a different position. Furthermore, the position detection module 132 may also determine correlations between the relative position of the particular webpage element and a metric associated with end-user selecting the particular webpage element (e.g., a number or frequency, a ratio, or other metrics of transactions for which the end-users select the particular payment option for the transactions). In some embodiments, the position detection module 132 may feed the data (along with other data such as type of merchandises being sold at the website, a size of the merchant, etc.) into a machine learning model to determine an optimal position (e.g., the position of the webpage element that would produce the maximum number of selection of the particular payment option).

In some embodiments, the position detection module 132 is part of (or used by) a risk assessment system for the service provider server 130. In some embodiments, the particular webpage element 406 may be associated with initiating an electronic transaction request with the service provider server 130 (e.g., initiating an electronic payment request, etc.). Thus, when an end user selects the particular webpage element 406 (e.g., a button, a link, etc.) that appears on the webpage 400 (e.g., a transaction checkout webpage), the web browser directs the end user to a website associated with the service provider server 130. And, when the interface server 134 receives a request (e.g., a transaction request) from a website (e.g., the webpage 400), the risk assessment system of the service provider server 130 may then use the position detection module 132 to access the webpage 400 and to determine a relative position of the particular webpage element 406 among the group of related webpage elements that appear on the webpage 400 when the webpage 400 is rendered. The risk assessment system may then use the determined relative position to determine a risk associated with the transaction request. For example, the risk assessment system may determine a higher risk for the transaction request when the determined position of the particular webpage element 406 is different from a predetermined position. In some embodiments, the risk assessment system may determine a higher risk for the transaction request when the determined position of the particular webpage element 406 is lower, and may determine a lower risk for the transaction request when the determined position of the particular webpage element 406 is higher (or vice versa). The risk assessment system may authorize or deny the transaction request based on the determined risk.

In addition to the position, in some embodiments, the position detection module 132 may also determine other appearance characteristics of the particular webpage element 406, such as a size of the webpage element 406, a color of the webpage element 406, and other appearance characteristics based on analyzing the programming code (e.g., analyzing the tags within the portion of programming code corresponding to the webpage element 406). The position detection module 132 may also compare the appearance characteristics of the particular webpage element 406 against the appearances of the related webpage elements (e.g., the webpage elements 404, 408, and 410) within the same group as the particular webpage element 406. The appearance of the particular webpage element 406 and the comparison may also be used to determine the correlation and/or to assess a risk of a transaction request as discussed herein.

Figure 6:
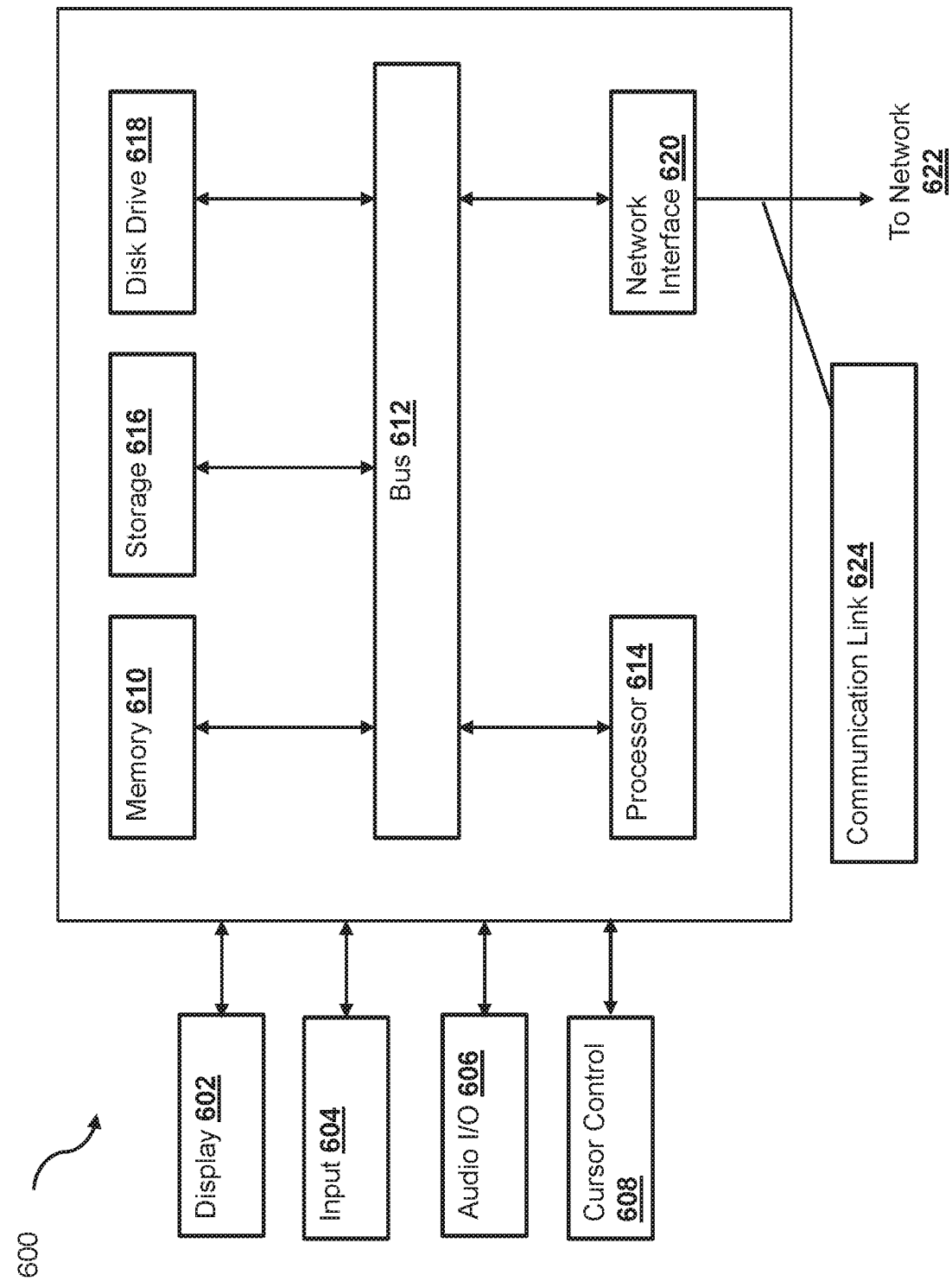
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant servers 120, 170, and 180, and the user device 110. In various implementations, the user device 110 may include a mobile cellular phone, personal computer (PC), laptop, wearable computing device, etc. adapted for wireless communication, and each of the service provider server 130 and the merchant servers 120, 170, and 180 the may include a network computing device, such as a server. Thus, it should be appreciated that the devices 110, 120, 130, 170, and 180 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the position detection of webpage elements described herein according to the process 300.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a processor; and
   a non-transitory computer-readable medium having stored thereon instructions executable by the processor to cause the system to perform operations comprising:
   identifying a grouping of webpage elements among a plurality of webpage elements of a webpage, wherein the webpage is configured to be rendered on a user device and is configured to facilitate, via one or more interactive elements of the plurality of webpage elements, a user of the user device to perform one or more electronic transactions via the webpage;
   determining that the grouping of webpage elements comprises a particular webpage element;
   determining a positioning of each of the grouping of webpage elements including the particular webpage element within the webpage; and
   based on the determined positioning of each of the grouping of webpage elements including the particular webpage element within the webpage, causing a risk level to be assessed for a transaction request made via the webpage, wherein the transaction request is assessed a first risk level based on the particular webpage element being present at a first particular position within the webpage relative to one or more other webpage elements of the grouping of webpage elements, and wherein the transaction request is assessed a second risk level lower than the first risk level based on the particular webpage element being present at a second particular position within the webpage relative to the one or more other webpage elements of the grouping of webpage elements.

2. The system of claim 1, wherein determining the positioning of each of the grouping of webpage elements comprises analyzing a code structure of the webpage.

3. The system of claim 2, wherein the code structure of the webpage comprises a document object model (DOM).

4. The system of claim 1, wherein the operations further comprise:
   causing the transaction request to be approved based on the risk level.

5. The system of claim 1, wherein a first one of the plurality of webpage elements corresponds to a first particular electronic transaction processing service and the particular webpage element corresponds to a different electronic transaction processing service.

6. The system of claim 1, wherein the operations further comprise:
   prior to determining the positioning of each of the grouping of webpage elements including the particular webpage element within the webpage, eliminating at least a first webpage element from the grouping of webpage elements, wherein positioning is not determined for the first webpage element.

7. The system of claim 1, wherein identifying the grouping of webpage elements is based on a determination that the grouping of webpage elements corresponds to target content webpage subject matter.

8. The system of claim 7, wherein the determination that the grouping of webpage elements corresponds to target content webpage subject matter is based on an application of a machine learning model to the grouping of webpage elements.

9. A method, comprising:
   identifying, by a computer system, a grouping of webpage elements among a plurality of webpage elements of a webpage, wherein the webpage is configured to be rendered on a user device and is configured to facilitate, via one or more interactive elements of the plurality of webpage elements, a user of the user device to perform one or more electronic transactions via the webpage;
   determining, by the computer system, that the grouping of webpage elements comprises a particular webpage element;
   determining, by the computer system, a positioning of each of the grouping of webpage elements including the particular webpage element within the webpage; and
   based on the determined positioning of each of the grouping of webpage elements including the particular webpage element within the webpage, the computer system causing a risk level to be assessed for a transaction request made via the webpage, wherein the transaction request is assessed a first risk level based on the particular webpage element being present at a first particular position within the webpage relative to one or more other webpage elements of the grouping of webpage elements, and wherein the transaction request is assessed a second risk level lower than the first risk level based on the particular webpage element being present at a second particular position within the webpage relative to the one or more other webpage elements of the grouping of webpage elements.

10. The method of claim 9, wherein determining the positioning of each of the grouping of webpage elements comprises analyzing a code structure of the webpage.

11. The method of claim 10, wherein the code structure of the webpage comprises a document object model (DOM).

12. The method of claim 9, wherein the operations further comprise:
causing the transaction request to be approved based on the risk level.

13. The method of claim 9, wherein a first one of the plurality of webpage elements corresponds to a first particular electronic transaction processing service and the particular webpage element corresponds to a different electronic transaction processing service.

14. The method of claim 9, wherein the operations further comprise:
prior to determining the positioning of each of the grouping of webpage elements including the particular webpage element within the webpage, eliminating at least a first webpage element from the grouping of webpage elements, wherein positioning is not determined for the first webpage element.

15. The method of claim 9, wherein identifying the grouping of webpage elements is based on a determination that the grouping of webpage elements corresponds to target content webpage subject matter.

16. A non-transitory computer-readable medium having stored thereon instructions executable by a computer system to cause the computer system to perform operations comprising:
identifying a grouping of webpage elements among a plurality of webpage elements of a webpage, wherein the webpage is configured to be rendered on a user device and is configured to facilitate, via one or more interactive elements of the plurality of webpage elements, a user of the user device to perform one or more electronic transactions via the webpage;
determining that the grouping of webpage elements comprises a particular webpage element;
determining a positioning of each of the grouping of webpage elements including the particular webpage element within the webpage; and
based on the determined positioning of each of the grouping of webpage elements including the particular webpage element within the webpage, causing a risk level to be assessed for a transaction request which can be made via one or more of the grouping of webpage elements of the webpage, wherein the transaction request is assessed a first risk level based on the particular webpage element being present at a first particular position within the webpage relative to one or more other webpage elements of the grouping of webpage elements, and wherein the transaction request is assessed a second risk level lower than the first risk level based on the particular webpage element being present at a second particular position within the webpage relative to the one or more other webpage elements of the grouping of webpage elements.

17. The non-transitory computer-readable medium of claim 16, wherein identifying the grouping of webpage elements comprises crawling the webpage with a web crawler.

18. The non-transitory computer-readable medium of claim 16, wherein the operations further comprise:
receiving the transaction request from a user device;
assessing the risk of the transaction request at the first risk level or the second risk level; and
based on the first risk level or the second risk level, approving or denying the transaction request.

19. The non-transitory computer-readable medium of claim 16, wherein a first one of the plurality of webpage elements corresponds to a first particular electronic transaction processing service and the particular webpage element corresponds to a different electronic transaction processing service.

20. The non-transitory computer-readable medium of claim 16, wherein identifying the grouping of webpage elements is based on a determination that the grouping of webpage elements corresponds to target content webpage subject matter.

* * * * *